(No Model.)
E. STRIPPGEN.
COMPOSITE BOARD OR STRIP FOR WALLS, &c.
No. 492,849. Patented Mar. 7, 1893.
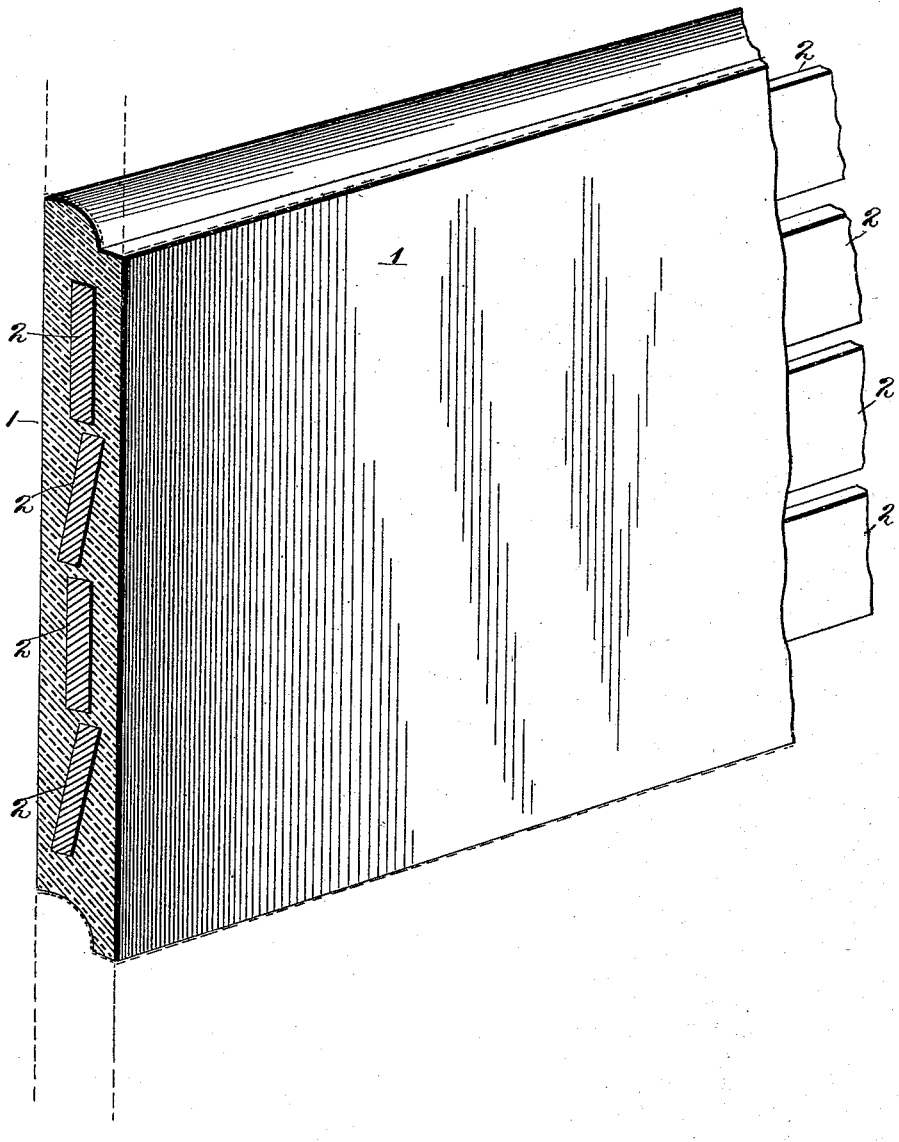
Witnesses
James B. Clark
Jno B Dempsey
Inventor
Emil Strippgen.
By his Attorneys,
Keller & Starek

UNITED STATES PATENT OFFICE.

EMIL STRIPPGEN, OF ST. LOUIS, MISSOURI.

COMPOSITE BOARD OR STRIP FOR WALLS, &c.

SPECIFICATION forming part of Letters Patent No. 492,849, dated March 7, 1893.

Application filed December 3, 1892. Serial No. 453,929. (No model.)

*To all whom it may concern:*

Be it known that I, EMIL STRIPPGEN, of the city of St. Louis, State of Missouri, have invented certain new and useful Improvements in Composite Boards or Strips for Walls, &c., of which the following is a full, clear, and exact description, reference being had to the accompanying drawing, forming a part hereof.

My invention has relation to composite boards or strips for walls and consists in the novel arrangement and combination of parts more particularly described in the specification and pointed out in the claims.

The drawing is a perspective view of one end of a lath constructed according to my invention.

The object of my invention is construct a board or strip that may be nailed or otherwise secured directly to the joists of a building thus forming the walls upon which may afterward be placed any suitable finish of such material as is commonly employed, for example hard finish, which covers the joints or cracks left between the respective laths.

Referring to the drawing, 1 represents the board or strip the cross section of which is preferably made to assume the form shown in the drawing, the opposite edges of which are suitably tongued and grooved as shown, whereby the strips when brought together will form the wall by a series of close joints. The board or strip herein shown is composed of a composition consisting of approximately two parts of plaster of paris and one part of saw dust thoroughly intermixed and cast in a proper mold.

2 represents a series of strips preferably of wood, but other substances may be employed in the place of the wooden strips, for instance corn stalks and the like properly cut. The series of strips above referred to are first laid in the mold in their proper positions, after which the composition is admitted into said mold and cast around said strips in the manner shown. By referring to the drawing it will be seen that each alternate strip is arranged parallel with the opposite sides or edges of the lath, while the remaining strips are arranged at an angle for purposes of breaking joint and preventing the composition from cracking in a longitudinal direction, thus interrupting any crack which may have started to form, and so preserve the durability of the lath. The nails or other means that may be necessary to secure the lath to the joists of the building are preferably driven through these strips which lie parallel to the opposite sides of the lath, which owing to their arrangement are designed to stand such rough usage.

By the use of my board a wall can be completed in a comparatively short space of time, and further dispensing with the labor generally employed in mixing mortar and applying the same to form the walls. The use of the board is not restricted to the formation of walls but may be used to form ceilings or in fact any surface over which a finish is designed to be put.

The board here described is proof against fire and water, and constitutes a very firm and durable form of construction.

Having fully described my invention, what I claim is—

1. A wall strip or board consisting of strips the alternate ones of which are arranged at an angle to the adjacent strips, said strips embedded in a body of composition composed of saw dust and plaster of paris, in proportions substantially as specified.

2. A wall strip or board composed of wooden strips each alternate strip being arranged at an angle to its adjacent strip to break joints, the said strips bound together with a composition consisting of a mixture of saw dust and plaster of paris in substantially the proportions specified, the longitudinal edges of the lath being suitably tongued and grooved, substantially as set forth.

In testimony whereof I affix my signature in the presence of two witnesses.

EMIL STRIPPGEN.

Witnesses:
EMIL STAREK,
C. F. KELLER.